US009415517B2

(12) United States Patent
Naidu et al.

(10) Patent No.: US 9,415,517 B2
(45) Date of Patent: Aug. 16, 2016

(54) TACTILE ARRAY SENSOR

(71) Applicant: Prakash C R J Naidu, Ottawa (CA)

(72) Inventors: Prakash C R J Naidu, Ottawa (CA);
Srinivasan A Mandayam, West Newton, MA (US); Kshirsagar C J Naidu, Ottawa (CA)

(*) Notice: Subject to any disclaimer, the term of this patent is extended or adjusted under 35 U.S.C. 154(b) by 229 days.

(21) Appl. No.: 14/034,349

(22) Filed: Sep. 23, 2013

(65) Prior Publication Data

US 2014/0088764 A1 Mar. 27, 2014

Related U.S. Application Data

(60) Provisional application No. 61/705,137, filed on Sep. 24, 2012.

(51) Int. Cl.
*G01R 27/26* (2006.01)
*B25J 9/16* (2006.01)
*H03K 17/96* (2006.01)
*G06F 1/00* (2006.01)

(52) U.S. Cl.
CPC .......... B25J 9/1694 (2013.01); G01R 27/2605 (2013.01); H03K 17/962 (2013.01); *G05B 2219/40625* (2013.01); *G06F 1/00* (2013.01); *G06F 2101/00* (2013.01); *G09G 2230/00* (2013.01); *H03K 2017/9602* (2013.01)

(58) Field of Classification Search
CPC ......... G06F 1/00; G06F 2101/00; G10L 1/00; G10L 7/00; G09G 1/00; G09G 2230/00
See application file for complete search history.

(56) References Cited

U.S. PATENT DOCUMENTS

| | | | | |
|---|---|---|---|---|
| 4,588,348 A | * | 5/1986 | Beni et al. | 414/730 |
| 5,861,875 A | * | 1/1999 | Gerpheide | 345/174 |
| 7,046,230 B2 | * | 5/2006 | Zadesky et al. | 345/156 |
| 2002/0060953 A1 | * | 5/2002 | Farine | G04C 3/14 368/69 |
| 2006/0042385 A1 | * | 3/2006 | Sassolini | G01C 19/5769 73/514.38 |
| 2006/0254369 A1 | * | 11/2006 | Yoon | A61B 5/6804 73/862.041 |
| 2007/0087564 A1 | * | 4/2007 | Speakman | H01G 9/2031 438/674 |
| 2010/0295383 A1 | * | 11/2010 | Cummings | H01L 31/02021 307/151 |
| 2011/0031041 A1 | * | 2/2011 | Bulea | G06F 3/044 178/18.06 |

* cited by examiner

*Primary Examiner* — Huy Q Phan
*Assistant Examiner* — Temilade Rhodes-Vivour

(57) ABSTRACT

A capacitance based tactile array sensor is disclosed that provides for close resolution of sensing pixels by using insulated conductors as electrodes, and allows for eliminating the need for a joint or connection interface near periphery of the sensor array. Optional aspects of the invention include provision for allowing use of stretchable conductors, reduction of the burden of number of connections at one layer of conductors in the sensor, providing for differential sensing resolutions at different areas of sensing, and modularity in configuration allowing replacement of a defective sensor pixel in the array. The tactile array sensor may be integrated with surface of a robotic hand's finger, palm, or any other surface of a device that requires multi-point sensing of external contacts. The capacitance information is processed for useful display or control of systems based on the contact feedback.

9 Claims, 6 Drawing Sheets (View P)

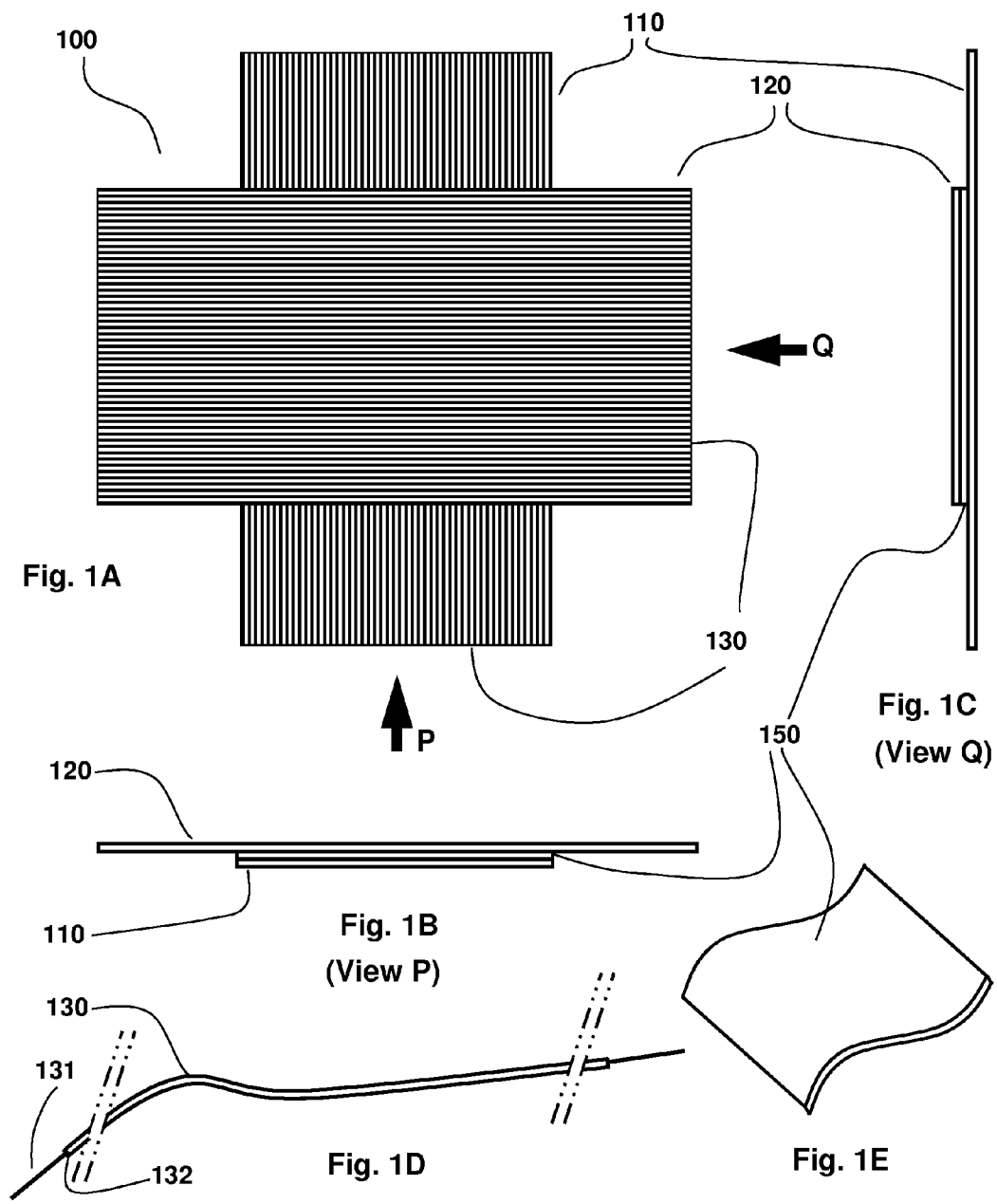

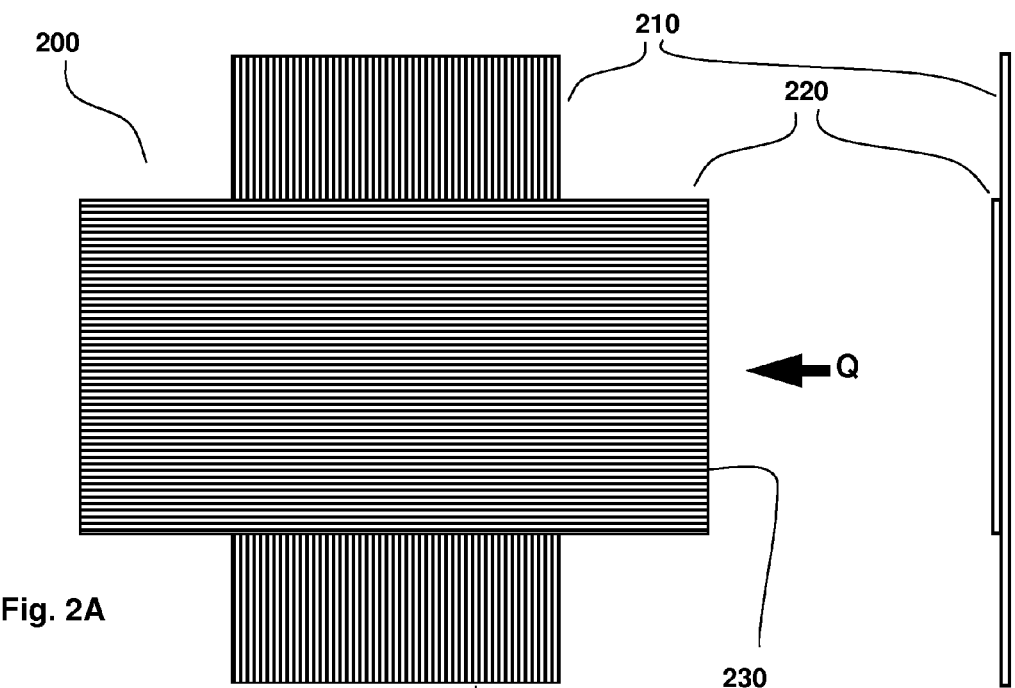
Fig. 2A
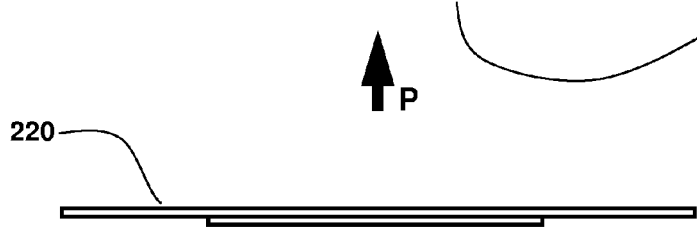
Fig. 2B
(View P)
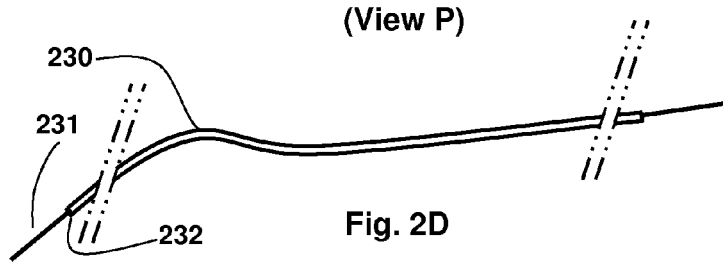
Fig. 2D
Fig. 2C
(View Q)

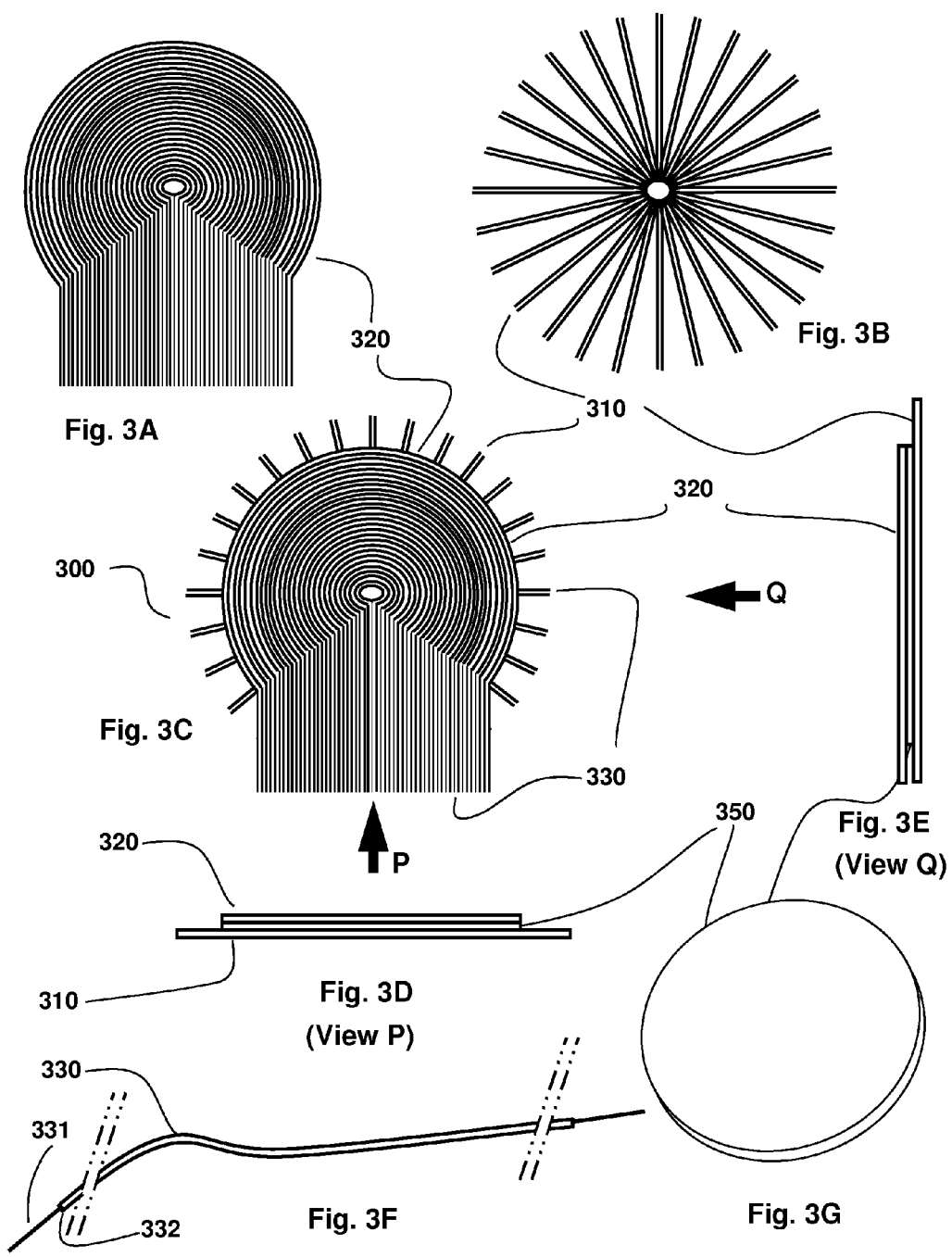

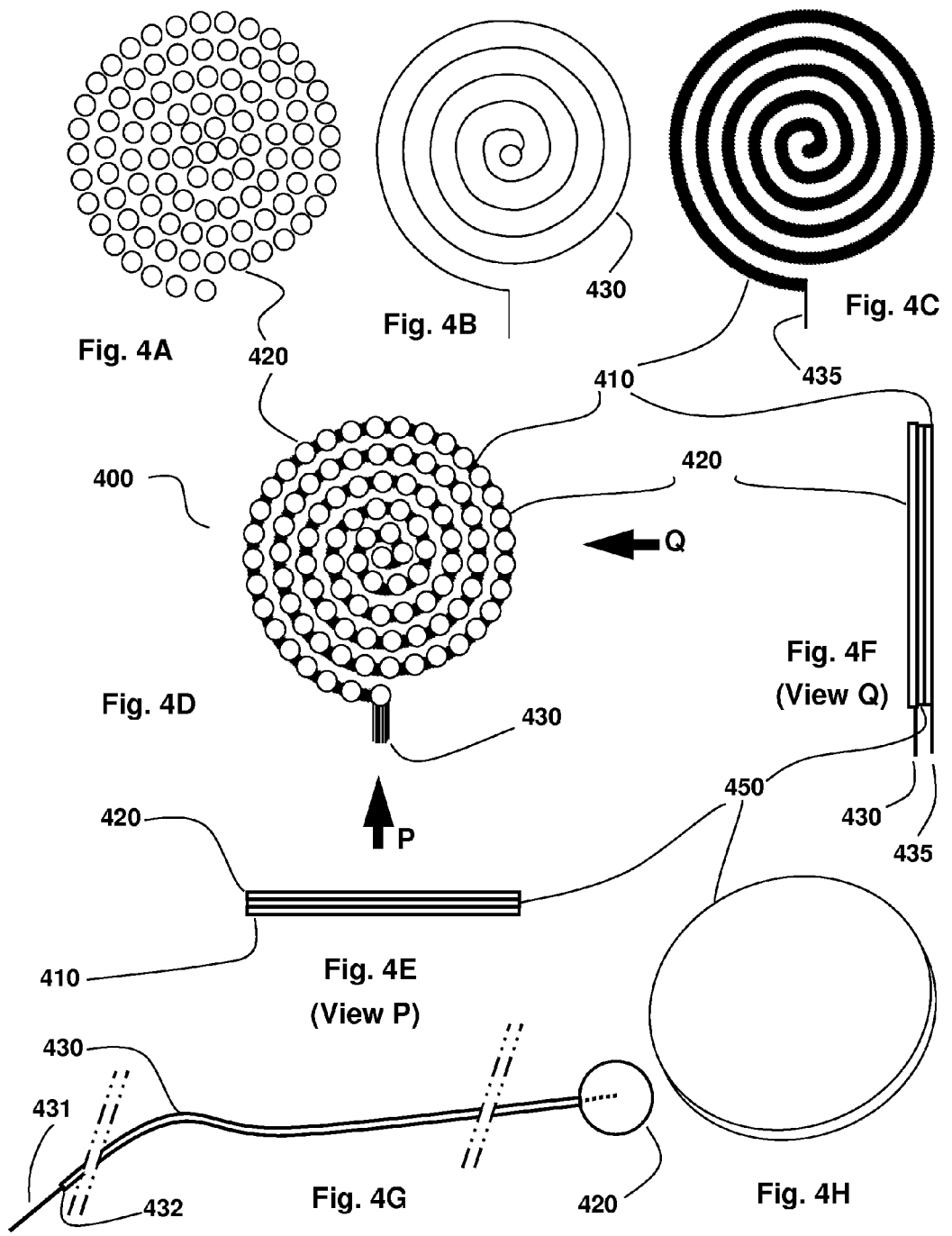

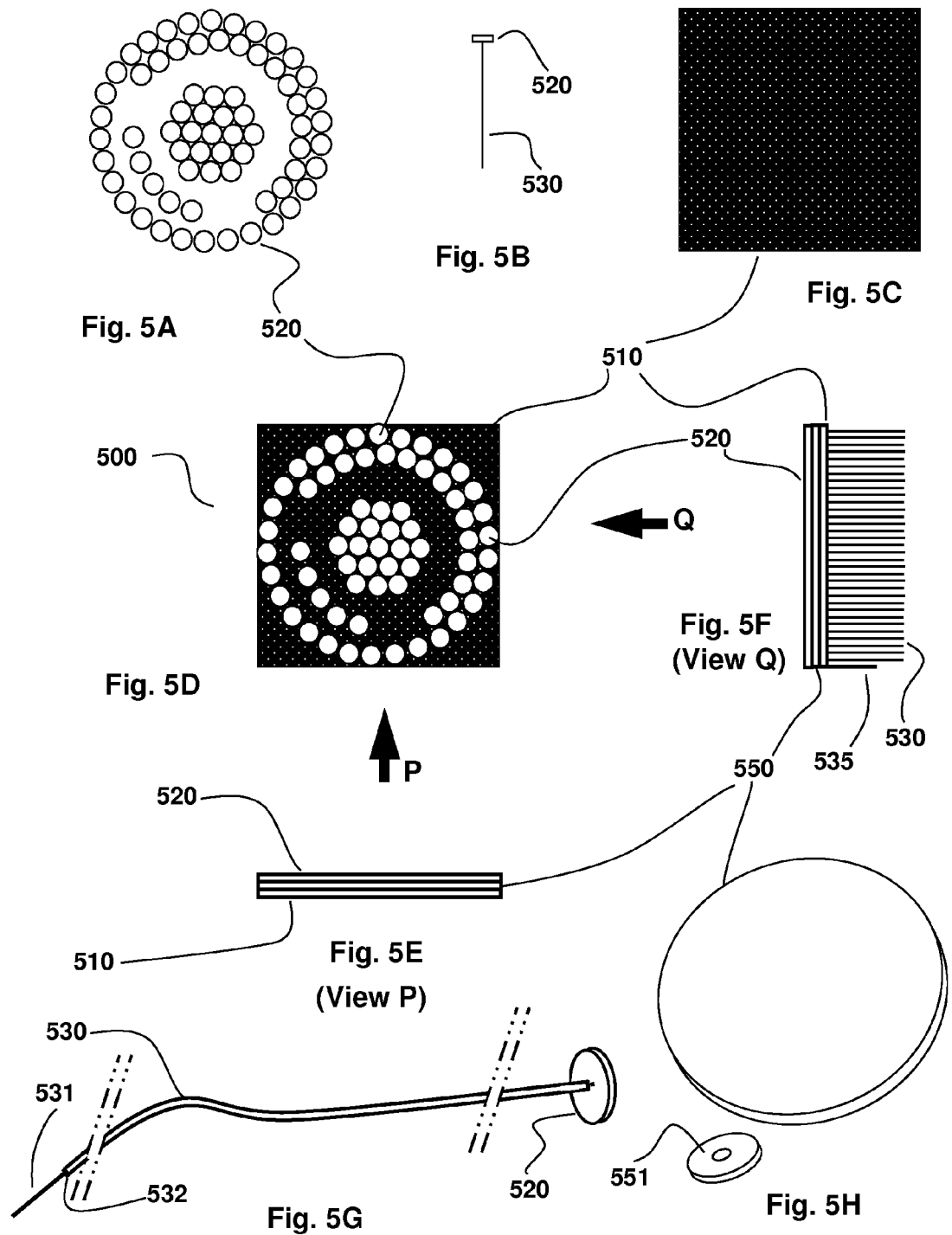

TACTILE ARRAY SENSOR

RELATED U.S. PROVISIONAL PATENT APPLICATION

This application claims the benefit of U.S. Provisional Patent Application No. 61/705,137, filed 24 Sep. 2012, including all the written description of the inventions described therein and making claim to the inventions disclosed therein.

STATEMENT REGARDING FEDERALLY SPONSORED RESEARCH OR DEVELOPMENT

The work on which the disclosure of this application is based is partially funded by National Science Foundation (NSF) under the Small Business Innovation Research (SBIR) program.

BACKGROUND OF THE INVENTION

This invention relates to multi-point sensing of a contact with an external surface of a device. The device may be a robot hand, a robot body part, or any other component or part of any system that requires sensing an external contact with another body or part in the proximity environment with certain preferred parameters. For example, in order to be as similar to human skin as possible, robot skin needs to be flexible to enable draping over curved surfaces such as robot fingers, and facilitate sensing of multi-point contact at close resolution. A tactile array sensor is a very useful means to take artificial human made devices closer to live beings in terms of sensing and therefore has broad application in several fields. Pressure profile sensing using a sensor array linked to Capacitance based transducers is the most established means reported to date.

There have been some disclosures to develop a multi-point array sensor. An early disclosure by Miller et. al. (U.S. Pat. No. 5,374,787 dated Dec. 20, 1994) describes a sensor matrix array made of sensor pads in which capacitance changes as an object approaches a sensor pad, thus computing the position of the approaching object in relation with the sensor array. Wellman et. al. (U.S. Pat. No. 5,983,727, Issued Nov. 16, 1999) used an array of cavities formed in a substantially incompressible mounting structure. The cavities are filled with fluid, and covered by flexible elastic membrane; and the fluid pressure caused by touch with external objects is measured by transducers connected with the respective cavities. The transducers are capacitors or alternatively radiation (optical or ultrasonic) emitter-receiver sets. Peine et. al. (U.S. Pat. No. 7,378,856, Issued May 27, 2008) disclose elimination of cavities and fluid; instead, rows and columns of conductive strips separated by a thin layer of flexible deformable material such as silicone gel are used to form a capacitance array. Son et. al. (U.S. Pat. No. 7,430,925, Issued Oct. 7, 2008) disclose a Hybrid Tactile Sensor that introduces an intermediate connecting harness made from a flexible film claimed to overcome the problems of shorting between connections, mechanical stress, bulkiness, and fabrication difficulties as regards layout of electrical connections faced. Son et. al. (US Patent Application #US 2009/0033341 pub. dated Feb. 5, 2009) have disclosed a rectangular array of so called tile sensors. A different conduction contact based sensing approach is disclosed by Swallow et. al. (PCT Int. Publication #WO 01/75778 dated 11 Oct. 2001) which describes a pressure sensitive textile woven with orthogonal strands of conductive and insulative yarn. Other textile based approaches have also been reported by Gibson (U.S. Pat. No. 4,659,873) and Sandbach (PCT Int. Pub. #WO 01/75924 dated 11 Oct. 2001). Sandbach has disclosed a multi-layer fabric with two conductive layers separated by insulative layer, the conductive strands coming in contact with each other due to pressure from touch with an object, thus sensing the touch. A multi-layer conductive fabric based approach comprising of two layers of orthogonally laid conductive fabric strands separated by an elastically compressible dielectric material layer; that uses the capacitance generation at the crossover pixel points of the conductive strands of the fabric is disclosed by Manaresi et. al. (U.S. Pat. No. 6,826,968 dated Dec. 7, 2004).

Recent research is leading towards micro and nano resolution new materials development, for example, Li et. al. ("Multifunctional Graphene Woven Fabrics", Li, X., Sun, P., Fan, L., Zhu, M., Wang, K., Zhong, M., Wei, J., Wu, D., Cheng, Y., Zhu, H., Nature, Scientific Reports 2, Article #395, 4 May 2012) have reported development of graphene-based woven fabric (GWF) by interlacing two sets of orthogonal graphene micron-ribbons embedded with Polydimethylsiloxane (PDMS). Further, the research is progressing towards wearable conductive fiber integrated sensors, for example, Gibbs & Asada ("Wearable Conductive Fibre Sensors for Multi-Axis Human Joint Angle Measurements", Gibbs, P. T., Asada, H. H., Journal of Neuro-Engineering and Rehabilitation 2005, 2:7.

However, in spite of the above disclosures and research work reported in the prior art, there is no sub-millimeter resolution multi-point array tactile sensor available in the market to date. Functional requirement for an artificial robot skin type product with resolution in the range of 0.1 mm-1 mm is a critical parameter (Srinivasan, M. A., & Dandekar, K., "An investigation of the mechanics of tactile sense using two-dimensional models of the primate fingertip", Biomech. Eng, 118:1, pp. 48-55, February 1996; Srinivasan, M. A., & Gulati, R. J., "In vivo compressibility of the human fingerpad", Advances in Bioengineering, 22, pp. 573-576, 1992; Srinivasan, M. A., & LaMotte, R. H., "Encoding of shape in the responses of cutaneous mechanoreceptors", in O. Franzen, & J. Westman-Eds., Wenner-Gren Intl. Symposium Series, pp. 59-69, 1991, New York: Macmillan). One of the crucial factors determining the success of a widely applicable robotic skin product is its crossing the so called tactile sensing two-point limen threshold. This threshold is defined by the smallest separation at which two points applied simultaneously to the human finger skin can be distinguished from one another, and is close to 1 mm. Another drawback in the prior art is that the sensing electrodes need a means for connection. Although an intermediate connecting harness made from a flexible film to enable connection with an IC is reported as a solution for this problem in the prior art, it introduces an additional member and thus complexity in the sensing system. Furthermore, the prior art has not disclosed configurations to enable easy and low cost assembly of sensor arrays using off-the-shelf components, using methods more suitable for automation of manufacturing process, avoiding use of expensive infrastructure. The prior art also has constraints such as excessive connections, lack of flexibility in deploying different resolutions in different sensing areas particularly relevant to biomimetic robotics, and lack of modularity in sensor pixels which makes replacement of individual or at least a small group of sensor pixels difficult.

Embodiments and aspects of the present invention overcome some of the difficulties in prior art either separately, individually or in combination with each other. The advantages of the present invention will become apparent from the description and accompanying drawings.

BRIEF SUMMARY OF THE INVENTION

A tactile array sensor is disclosed to provide for sensing of contact and the resulting pressure exerted by the contact at different points of a surface. The surface may be the surface of a robotic hand's finger, palm, or any other surface of a device that requires multi-point sensing of external contacts. The sensing is based on formation of capacitor pixels by placement of a dielectric material layer between two layers of insulated conducting electrodes that function as an array of the tactile sensor. The dielectric material is compressible, flexible, and stretchable. The insulated conductor electrodes are slender, and therefore can be placed adjacent to each other at close resolution and are flexible. A contact on the surface of external layer causes pressure and resulting compression of the dielectric layer. The change in capacitance of a pixel is detected by an external circuit, identifying the contact and its location.

The disclosure includes five of the possible embodiments of the tactile array sensors with inventive aspects, some of them common to multiple embodiments. In the first two embodiments, layers of insulated conductor electrodes are laid in substantially orthogonal directions to each other. While in the first embodiment, the electrode layers are separated by a separate layer of dielectric material; in the second embodiment, the insulation of conductor electrodes itself is made of a dielectric material and serves the purpose of forming compressible capacitive pixel. In the third embodiment, one layer of insulated conductor electrodes are configured as concentric circles while the other layer is laid in the radial direction starting from the center of the concentric circles in the first layer. In the fourth embodiment, individual sensor pixels and their insulated conductive connection wires are laid in a spiral configuration in one layer, while another layer of conducting electrode is a single spiral shaped electrode. In the fifth embodiment, sensor pads are formed or connected perpendicular to insulated conductor electrodes that pass through a layer of compressible dielectric material and then through micro-holes of a conductive substrate surface of the device requiring multi-point sensing that acts as a common ground.

According to an aspect of the disclosed invention, the conductors are insulated and thus can continue to longer lengths on both sides of the tactile array eliminating the need for a joint or connection interface near periphery of the sensor array. This also allows for the sensor data processing circuit such as an IC to be relatively further away from the sensor array, facilitating remotely centralized circuit that may be attached to several sensor arrays; particularly advantageous for robots wherein fingers and other robot parts may need separate sensor arrays.

According to another aspect of the disclosed invention, the conductors are insulated and hence can be placed very close to each other at micro-millimeter center to center distance resolution by simple manual, semi-automated, or fully automated methods without relatively expensive methods such as PVD, photolithography or soft lithography and eliminating the need for expensive infrastructure such as clean room environment.

Courting to an additional but optional aspect of the disclosed invention, in one of the embodiments, the insulation of the conductors themselves is used for realizing the capacitor pixels, eliminating the need for a separate dielectric layer between the conductor layers. Furthermore, additionally, but optionally, this embodiment of the disclosed invention allows use of stretchable conductors of micro and even nano diameter size such as transparent conductive Graphene nanoribbons with transparent, flexible and stretchable insulation such as PDMS coating that can facilitate woven fabric like sensor array with very high resolution and good stretchable characteristics in both warp and weft directions.

In yet another embodiment of the disclosed invention, reduction of the burden of number of connections at one layer of conductors in the sensor is achieved by having radial conductor electrodes wherein the conductors can be electrically connected conveniently to a common terminal at one end at the center of the sensor array. Furthermore, additionally, but optionally, an aspect of this embodiment of the disclosed invention is reduction of the overall computation burden of the sensor by having a broader resolution of sensor array at peripheral region while maintaining a closer resolution of sensing array at a central region of the sensor. This is particularly of importance in biomimetic robotic hands as living beings have differential sensing resolutions at different areas of sensing organs depending on salience of sensing needs.

In addition, and optionally, a further embodiment of the disclosed invention achieves reduction of the burden of number of connections at one layer of conductors in the sensor by having a layer with single spiral conductor with only one end of the spiral as terminal while having individual pixel electrodes in the other layer again in spiral configuration allowing distinct identification defining a location of a contact sensing.

In yet another embodiment of the disclosed invention, the sensing pad assemblies are modular in configuration allowing flexibility in deployment such as different resolution in different regions depending on regional requirements, and moreover a defective sensor pad does not result in requirement of an entire sensor array to be repaired or replaced as just an individual sensor pad can be separately replaced. Moreover, in this embodiment of the disclosed invention, a conductive surface with micro-holes allowing passage of insulated conductors connected to the sensor pads is used as a common ground, thus reducing wiring and connections associated with a layer of conduction.

BRIEF DESCRIPTION OF THE DRAWINGS

FIG. 1A shows an overall assembled view of the first embodiment of the invention. FIG. 1B and FIG. 1C show end views of this embodiment. FIG. 1 D shows a typical insulated conductor wire used and FIG. 1E shows a typical dielectric material layer used in this embodiment.

FIG. 2A shows an overall assembled view of the second embodiment of the invention. FIG. 2B and FIG. 2C show end views of this embodiment. FIG. 2 D shows a typical conductor wire insulated by dielectric material used in this embodiment.

FIG. 3A shows one layer of the third embodiment of the invention, FIG. 3B shows another layer of the embodiment, and FIG. 3C shows an overall assembled view of the embodiment. FIG. 3D and FIG. 3E show end views of this embodiment. FIG. 3F shows a typical insulated conductor wire used and FIG. 3G shows a typical dielectric material layer used in this embodiment.

FIG. 4A shows one layer of sensor pixels of the fourth embodiment of the invention, FIG. 4B shows a sample preferred routing path of connecting insulated conductor, and FIG. 4C shows another layer of the embodiment. FIG. 4D shows an overall assembled view of the embodiment. FIG. 4E and FIG. 4F show end views of this embodiment. FIG. 4G shows a typical insulated conductor wire used and FIG. 4H shows a typical dielectric material layer used in this embodiment.

FIG. 5A shows one layer of sensor pixels of the fifth embodiment of the invention, FIG. 5B shows a typical modular sensor pad connected to insulated conductor, and FIG. 5C shows another layer of the embodiment. FIG. 5D shows an overall assembled view of the embodiment. FIG. 5E and FIG. 5F show end views of this embodiment. FIG. 5G shows a perspective view of a typical sensor pad connected to insulated conductor wire and FIG. 5H shows two typical optional configurations of dielectric material layer used in this embodiment.

DETAILED DESCRIPTION OF THE INVENTION

Figure 6:
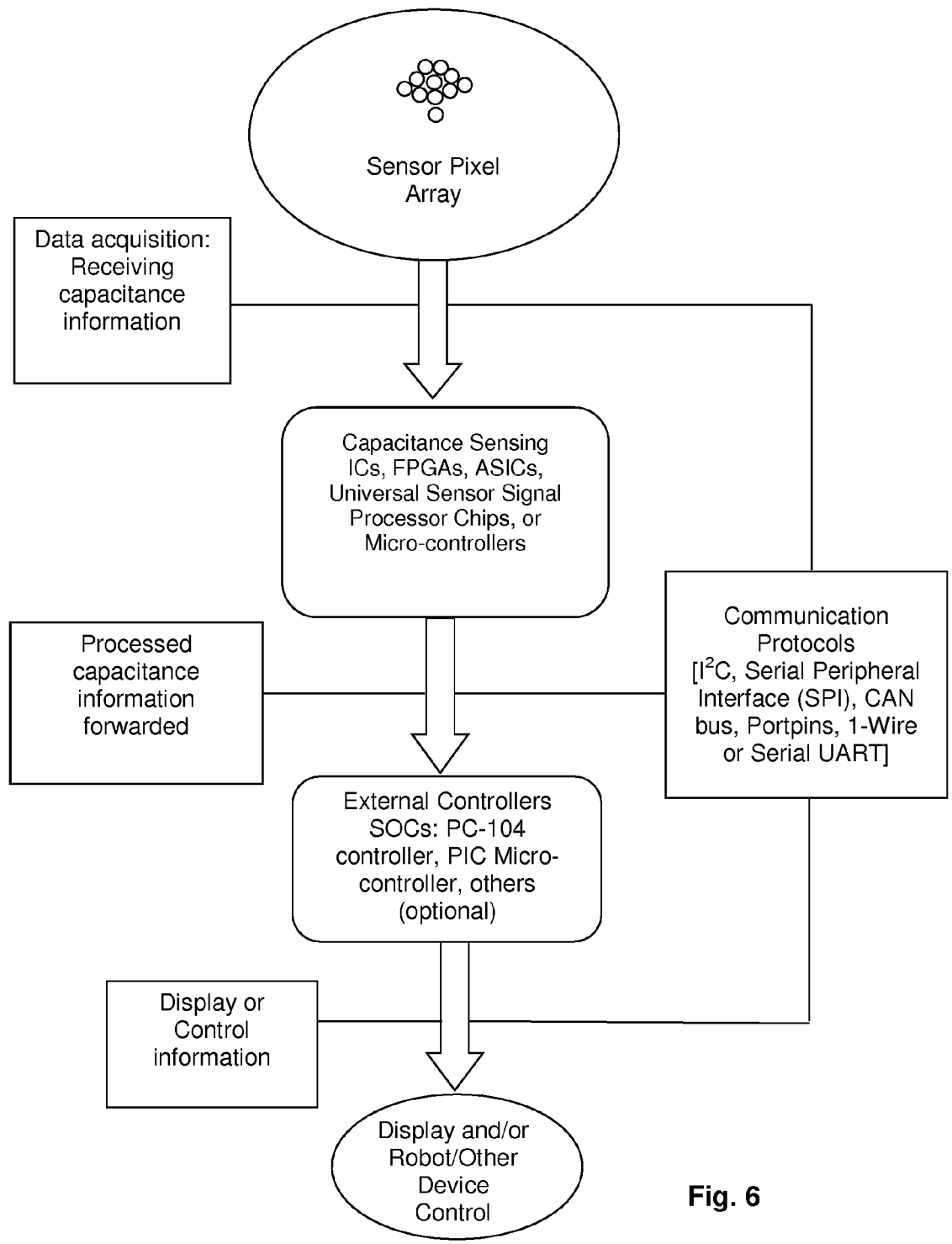
FIG. 6 shows the overall configuration of data acquisition from the sensor pixel array, its processing, and display or control of external devices based on the sensing information.

A first embodiment 100 of the disclosed invention is illustrated in FIG. 1A wherein one set of insulated conductor electrodes 130 are laid in one layer 110, another set of insulated conductor electrodes 130 are laid in another layer 120 at substantially orthogonal direction to the electrodes in the first layer; the insulated conductor electrode layers separated by a dielectric material layer 150 (shown in FIG. 1E). The end views P and Q illustrated in FIGS. 1B and 1C show the arrangement of these layers relative to each other. The intersections of insulated conductors sandwiching dielectric material in-between form capacitor pixels that function as an array of the tactile sensor. In one option of this embodiment, the dielectric material is Polydimethylsiloxane (PDMS). In a second option of this embodiment, the dielectric material is a tape or sheet made of a dielectric material with dielectric constant comparable to or greater than the dielectric constant of PDMS (2.3 to 2.8), for example a polyimide such as Kapton™ (DuPont®, Wilmington, Del., USA; dielectric constant 3.4 to 3.5); a foam or rubber such as Neoprene® (dielectric constant 4 to 6; for example 3M™ Neoprene® Foam Tape, 3M, St. Paul, Minn., USA) or other general rubber variants (dielectric constant 3 to 4) including Latex or Nitrile; or a synthetic fabric material with a polymer base such as spandex (Lycra®, Invista, Wichita, Kans., USA), Polyester, Nylon (dielectric constant 3.2 to 5).

According to one aspect of the disclosed invention, the insulated conductors 130 are made of conductors 131 insulated by a cover material 132 as illustrated in FIG. 1D and thus can continue to longer lengths on both sides of the tactile array eliminating the need for a joint or connection interface near periphery of the sensor array. This also allows for the sensor data processing circuit (not shown in the figures) such as an IC to be relatively further away from the sensor array, facilitating remotely centralized circuit that may be attached to several sensor arrays; particularly advantageous for robots wherein fingers and other robot parts may need separate sensor arrays. A typical insulated conductor used is a Polyurethane enameled coated Copper wire (0.1 mm diameter, Roshow Technology Co. Ltd., Zhejiang, China; Source: http://windingwires.en.alibaba.com), however, it can be any other insulated conductor material available in the market of any shape such as circular wire reel, flat ribbon reel or other shape currently available starting from 0.05 mm size.

According to a second aspect of the disclosed invention, the conductors 131 are insulated and hence can be placed very close to each other at micro-millimeter center to center distance resolution by simple manual, semi-automated, or fully automated methods without relatively expensive methods such as PVD, photolithography or soft lithography and eliminating the need for expensive infrastructure such as clean room environment. For example, in one optional configuration, the insulated conductor wires 130 of 0.1 mm outside diameter may be placed in contact with each other in the layers 110 and 120, enabling 0.1 mm center-to-center distance resolution between adjacent sensing pixels.

A second embodiment 200 of the disclosed invention is illustrated in FIG. 2A, wherein one set of conductor electrodes 231 insulated by a dielectric compressible and stretchable material 232 such as PDMS (FIG. 2D) are laid in one layer 210, another set of conductor electrodes 231 insulated by a dielectric compressible and stretchable material 232 such as PDMS (FIG. 2D) are laid in another layer 220 at substantially orthogonal direction to the electrodes in the first layer; the insulated conductor electrode layers separated by a dielectric material layer by virtue of the individual insulation of the conductors themselves. The end views P and Q illustrated in FIGS. 2B and 2C show the arrangement of these layers relative to each other. The intersections of insulated conductors sandwiching the insulation covers as dielectric material in-between form capacitor pixels that function as an array of the tactile sensor.

According to one aspect of the disclosed invention, the insulation 232 of the conductors 231 themselves is used for realizing the capacitor pixels, eliminating the need for a separate dielectric layer between the conductor layers. A typical bare conductor used is a Copper wire (99.99% pure, 0.05 mm diameter, Nilaco Corp., Tokyo, Japan; Source: http://nilaco.jp/en/), however, it can be any other bare conductor material available in the market of any shape such as circular wire reel, flat ribbon reel or other shape currently available starting from 0.025 mm size. Application of compressible and stretchable dielectric material insulation 232 around the bare conductor 231 is by smearing a thin layer of PDMS (SYLGARD® 184 Silicone Elastomer, Dow Corning® make, Source: Krayden Inc., Ayers, Mass., USA) around the conductor. Persons skilled in the art may appreciate that the insulation layer may be made more uniform by techniques such as high speed spinning of bare conductor smeared by the PDMS while it is in fluid state, followed by curing in an oven for immediate use or curing at room temperature for a longer period. For example, the SYLGARD® coating may be heat cured in 35 minutes by keeping the coated conductor in oven at 100° C. Alternately, the SYLGARD® coating may be cured in 48 hours by keeping the coated conductor in room temperature at 25° C. Other insulating materials that are dielectric may be used with different application and curing techniques, and all such configurations are also covered by the scope and spirit of the disclosed invention; for examples, dielectric material with dielectric constant comparable to or greater than the dielectric constant of PDMS (2.3 to 2.8): namely a polyimide such as Kapton™ (DuPont®, Wilmington, Del., USA; dielectric constant 3.4 to 3.5); a foam or rubber such as Neoprene® (dielectric constant 4 to 6) or other general rubber variants (dielectric constant 3 to 4) including Latex or Nitrile; or a synthetic fabric material with a polymer base such as spandex (Lycra®, Invista, Wichita, Kans., USA), Polyester, Nylon (dielectric constant 3.2 to 5).

According to a second aspect of the disclosed invention, the conductors 231 are insulated and hence can be placed very close to each other at micro-millimeter center to center distance resolution by simple manual, semi-automated, or fully automated methods without relatively expensive methods such as Physical Vapor Deposition (PVD), photolithography or soft lithography and eliminating the need for expensive infrastructure such as clean room environment.

Additionally, but optionally, a third aspect of the disclosed invention is that stretchable conductors 231 of micro and even nano diameter size such as transparent conductive Graphene nanoribbons with transparent, flexible and stretchable insulation 232 such as PDMS coating can facilitate woven fabric like sensor array with very high resolution and good stretchable characteristics in both warp and weft directions. A typical stretchable conductor used is Dyneon™ Fluoropolymer (3M®, St. Paul, Minn., USA), but other conducting materials that are stretchable may be used, and all such configurations are also covered by the scope and spirit of the disclosed invention.

A third embodiment 300 of the disclosed invention is illustrated in FIG. 3C wherein one set of insulated conductor electrodes 330 are laid in one layer 320 as concentric circles configuration with the ends of the conductors routed outward on any one side of the sensor array (FIG. 3A), another set of insulated conductor electrodes 330 are laid in another layer 310 at substantially radial direction (FIG. 3B) starting from the center of the concentric electrodes in the first layer; the insulated conductor electrode layers separated by a dielectric material layer 350 (FIG. 3G). The end views P and Q illustrated in FIGS. 3D and 3E show the arrangement of these layers relative to each other. The intersections of insulated conductors sandwiching dielectric material in-between form capacitor pixels that function as an array of the tactile sensor. In one option of this embodiment, the dielectric material is Polydimethylsiloxane (PDMS). In a second option of this embodiment, the dielectric material is a tape or sheet made of a dielectric material with dielectric constant comparable to or greater than the dielectric constant of PDMS (2.3 to 2.8), for example a polyimide such as Kapton™ (DuPont®, Wilmington, Del., USA; dielectric constant 3.4 to 3.5); a foam or rubber such as Neoprene® (dielectric constant 4 to 6; for example 3M™ Neoprene® Foam Tape, 3M, St. Paul, Minn., USA) or other general rubber variants (dielectric constant 3 to 4) including Latex or Nitrile; or a synthetic fabric material with a polymer base such as spandex (Lycra®, Invista, Wichita, Kans., USA), Polyester, Nylon (dielectric constant 3.2 to 5).

According to one aspect of the disclosed invention, the insulated conductors 330 are made of conductors 331 insulated by a cover material 332 as illustrated in FIG. 3F and thus can continue to longer lengths on all sides of the tactile array eliminating the need for a joint or connection interface near periphery of the sensor array. This also allows for the sensor data processing circuit such as an IC to be relatively further away from the sensor array, facilitating remotely centralized circuit that may be attached to several sensor arrays; particularly advantageous for robots wherein fingers and other robot parts may need separate sensor arrays. A typical insulated conductor used is a Polyurethane enameled coated Copper wire (0.1 mm diameter, Roshow Technology Co. Ltd., Zhejiang, China; Source: http://windingwires.en.alibaba.com), however, it can be any other insulated conductor material available in the market of any shape such as circular wire reel, flat ribbon reel or other shape currently available starting from 0.05 mm size.

According to a second aspect of the disclosed invention, the conductors 331 are insulated and hence can be placed very close to each other at micro-millimeter center to center distance resolution by simple manual, semi-automated, or fully automated methods without relatively expensive methods such as PVD, photolithography or soft lithography and eliminating the need for expensive infrastructure such as clean room environment.

In addition, and optionally, a third aspect of the disclosed invention is reduction of the burden of number of connections at one layer of conductors in the sensor. In the layer 310 having the radial conductor electrodes, the conductors can be electrically connected conveniently to a common terminal at one end at the center of the sensor array whereas the radially outer ends can be distinct defining a radial location of a contact sensing.

Furthermore, additionally, but optionally, a fourth aspect of the disclosed invention is reduction of the overall computation burden of the sensor by having a broader resolution of sensor array at peripheral region while maintaining a closer resolution of sensing array at a central region of the sensor. This is particularly of importance in biomimetic robotic hands as living beings have differential sensing resolutions at different areas of sensing organs depending on salience of sensing needs.

A fourth embodiment 400 of the disclosed invention is illustrated in FIG. 4D wherein individual electrode sensor pixels 420 are laid in one layer as a spiral configuration (FIG. 4A) with respective insulated conductor connections also laid in spiral layout (FIG. 4B), a spiral electrode is laid in another layer 410 (FIG. 4C) with substantially matching configuration relative to the center of the spiral layout of electrode sensor pixels in the first layer; the electrode layers separated by a dielectric material layer 450 (FIG. 4H). The end views P and Q illustrated in FIGS. 4E and 4F show the arrangement of these layers relative to each other. The sensor pixels and spiral electrode sandwiching dielectric material in-between form capacitor pixels that function as an array of the tactile sensor. In one option of this embodiment, the dielectric material is Polydimethylsiloxane (PDMS). In a second option of this embodiment, the dielectric material is a tape or sheet made of a dielectric material with dielectric constant comparable to or greater than the dielectric constant of PDMS (2.3 to 2.8), for example a polyimide such as Kapton™ (DuPont®, Wilmington, Del., USA; dielectric constant 3.4 to 3.5); a foam or rubber such as Neoprene® (dielectric constant 4 to 6; for example 3M™ Neoprene® Foam Tape, 3M, St. Paul, Minn., USA) or other general rubber variants (dielectric constant 3 to 4) including Latex or Nitrile; or a synthetic fabric material with a polymer base such as spandex (Lycra®, Invista, Wichita, Kans., USA), Polyester, Nylon (dielectric constant 3.2 to 5).

According to one aspect of the disclosed invention, the insulated conductor connections 430 in the first layer are made of conductors 431 directly connected to the sensor pixels 420 at one end and insulated by a cover material 432 as illustrated in FIG. 4G, and thus can continue to longer lengths on a side of the tactile array eliminating the need for a joint or connection interface near periphery of the sensor array. This also allows for the sensor data processing circuit such as an IC to be relatively further away from the sensor array, facilitating remotely centralized circuit that may be attached to several sensor arrays; particularly advantageous for robots wherein fingers and other robot parts may need separate sensor arrays. A typical insulated conductor used is a Polyurethane enameled coated Copper wire (0.1 mm diameter, Roshow Technology Co. Ltd., Zhejiang, China; Source: http://windingwires.en.alibaba.com), however, it can be any other insulated conductor material available in the market of any shape such as circular wire reel, flat ribbon reel or other shape currently available starting from 0.05 mm size.

According to a second aspect of the disclosed invention, the conductor connections 430 in the first layer are insulated and hence can be placed very close to each other at micro-millimeter center to center distance resolution by simple manual, semi-automated, or fully automated methods without relatively expensive methods such as PVD, photolithography or soft lithography and eliminating the need for expensive infrastructure such as clean room environment.

In addition, and optionally, a third aspect of the disclosed invention is reduction of the burden of number of connections at one layer of conductors in the sensor. The layer with single spiral conductor 410 has only one end of the spiral as terminal and exits from the sensor array as a single insulated conductor wire 435 (FIG. 4F). In the first layer having the individual pixel electrodes 420, each pixel can be distinctly identified defining a location of a contact sensing.

A fifth embodiment 500 of the disclosed invention is illustrated in FIG. 5D wherein sensor pads 520 (FIG. 5A) are formed or connected at the ends of insulated conductor electrodes 530 (FIG. 5B). Surface 510 (FIG. 5C) of any device requiring multi-point sensing, for example a robot finger is made of a conductive material which may be a conductive material coated plastic or any non-metal, thin metal sheet like Aluminum, or a conductive fabric drape like a glove. Micro-holes in this surface 510 allow the insulated conductors 530 to pass through the surface, in a direction substantially perpendicular to the surface. The end views P and Q illustrated in FIGS. 5E and 5F show the arrangement of these layers relative to each other. A thin layer 550 of a dielectric material such as PDMS, or a polyimide is laid between the surface and the sensor pads. Any dielectric material with dielectric constant comparable to or greater than the dielectric constant of PDMS (2.3 to 2.8) may be used, for example a polyimide such as Kapton™ (DuPont®, Wilmington, Del., USA; dielectric constant 3.4 to 3.5); a foam or rubber such as Neoprene® (dielectric constant 4 to 6; for example 3M™ Neoprene® Foam Tape, 3M, St. Paul, Minn., USA) or other general rubber variants (dielectric constant 3 to 4) including Latex or Nitrile; or a synthetic fabric material with a polymer base such as spandex (Lycra®, Invista, Wichita, Kans., USA), Polyester, Nylon (dielectric constant 3.2 to 5). In one option, the dielectric layer 550 may be a single sheet or tape covering the area below multiple sensor pads. In a second option, individual sensor pads 520 may have individual washer like dielectric layer 551 (FIG. 5H) below the sensor pads. The washers may be embedded or integrated with the sensor pad or maybe separate and loosely held like a generally known washer. Multiple sensor pad-washer-conductor assembled units may be integrated to a desired region of the device requiring multi-point sensing with region specific density of sensor pads. The interfaces of sensor pads and conductive substrate sandwiching dielectric material in-between form capacitor pixels that function as an array of the tactile sensing skin deployed over the device requiring multi-point sensing.

According to one aspect of the disclosed invention, the insulated conductor connections 530 are made of conductors 531 directly connected to the sensor pixels 520 at one end and insulated by a cover material 532 as illustrated in FIG. 5G and thus can continue to longer lengths below the substrate of the tactile sensing array surface eliminating the need for a joint or connection interface below the sensor array. This also allows for the sensor data processing circuit such as an IC to be relatively further away from the sensor array, facilitating remotely centralized circuit that may be attached to several sensor arrays; particularly advantageous for robots wherein fingers and other robot parts may need separate sensor arrays. A typical insulated conductor used is a Polyurethane enameled coated Copper wire (0.1 mm diameter, Roshow Technology Co. Ltd., Zhejiang, China; Source: http://windingwires.en.alibaba.com), however, it can be any other insulated conductor material available in the market of any shape such as circular wire reel, flat ribbon reel or other shape currently available starting from 0.05 mm size.

According to a second aspect of the disclosed invention, the conductors 531 are insulated and hence can be placed very close to each other at micro-millimeter center to center distance resolution by simple micro-drilling of holes on the surface 510 of the device requiring multi-point sensing. For example, in one optional configuration, the insulated conductor wires 530 of 0.1 mm outside diameter may be inserted in the 0.1 mm diameter micro-holes in the substrate layer surface 510 while the sensor pads 520 formed at the end of the conductors are 0.5 mm diameter, enabling 0.6 mm center-to-center distance resolution between adjacent sensing pads (leaving a 0.1 mm gap between adjacent sensor pads).

According to a third aspect of the disclosed invention, the sensing pad assemblies are modular in configuration (FIGS. 5B and 5G). This allows flexibility in deployment such as different resolution in different regions depending on regional requirements, and moreover a defective sensor pad does not result in requirement of an entire sensor array to be repaired or replaced as just an individual sensor pad can be separately replaced.

According to a fourth aspect of the disclosed invention, the conductive surface 510 is used as a common ground, thus reducing wiring and connections associated with a layer of conduction. This common ground layer is a single conductor 510 and therefore has only one terminal which exits from the sensor as a single insulated conductor wire 535 (FIG. 5F).

The sensor pixels or sensor pads are shown circular in the last two embodiments of the invention, however, those skilled in the art may appreciate that the shapes of sensor pixels may be any other shape such as elliptical, square, rectangular, diamond and other shapes, and all such configurations are covered within the scope and spirit of the disclosed invention.

An external circuit is connected to any of the disclosed embodiments to collect the information about change in capacitance pixels of a sensor array, analyze the information, determine the locations of contacts, optionally determine the magnitude of the contact pressure, and either display the information or transmit the information to other systems, for example, a robot controller to enable suitable action by a system based on the contact feedback information (FIG. 6). Capacitance sensing Integrated Circuits (ICs), for example, from Atmel®, ITD, STMicroelectronics®, Microchip™ Technology Inc., Omron®, Analog Devices®, Texas instruments® and other makes available from Mouser Electronics, Mansfield, Tex. or Digi-Key Corp, Thief River Falls, Minn., USA, or other sources may be used to receive data from the capacitance pixels and process the data based on programmable logic and command execution. Some of the specific capacitive touch sensor ICs that may be used such as QST108 or other enhanced sensor ICs (ST Microelectronics®, Geneva, Switzerland) and QT100, QT220, QT1040, or other enhanced sensor ICs (Atmel®, San Jose, Calif., USA) are based on QTouch™ and QProx™ capacitive technologies and Adjacent Key Suppression (AKS™) approach from Quantum Research Group (Hamble, UK). Universal sensor signal processor chips such as SSP1492 (Sensor Platforms Inc., Santa Rosa, Calif., USA) may also be used. Depending on the volume of manufacture of the sensor array circuit and its customization, the ICs may be even general purpose Field-Programmable Gate Arrays (FPGAs) or highly customized Application Specific Integrated Circuits (ASICs). Hardware description language such as Verilog (IEEE 1364) or VHDL (IEEE 1076-2008) may be used to describe the functionality of ASICs. Alternatively, additionally or optionally external controllers or integrated systems, for example Systems-On-Chip (SOCs) such as PC-104 controller, PICO Microcontroller (Microchip Technology Inc., Ariz., USA), or other controller may also be used. For example, mTouch™ Sensing Solutions from Microchip Technology Inc. enables implementing touch sensing functionality of the disclosed embodiments using microcontroller which may also be used for controlling actions of other devices based on the tactile sensing feedback. Optionally, the controller may be either separate or common for data acquisition from the capacitor pixels and controlling motion of a device such as a robot on whose parts the sensing skin is embedded. Additionally, but optionally separate or integrated Multiplexer and de-multiplexer ICs may be used to reduce signal transmission channels and process multiple data by sharing resources, further reducing the wiring burden. Appropriate communication protocols and means such as I²C, Serial Peripheral Interface (SPI), CAN bus, Portpins, 1-Wire®, Serial (Universal Asynchronous Receiver/Transmitter-UART) or any other methods may be used between the ICs and controllers for receiving, accumulating, and forwarding the capacitance related electronic information in digital or analog form. Different wired or wireless means such as Universal Serial Bus (USB™), Ethernet, Wi-Fi (IEEE 802.11), Bluetooth, or other wireless network technology based on IEEE 802.15.4 global standards to ensure interoperability and reliable communication suitable for short range and low power application such as ZigBee®, or its lower cost small footprint alternatives such as MiWi™ and MiWi™ P2P protocol stacks or any other means may be deployed for communication of the information from one module to another. RF transceivers such as MRF24J40MC (2.4 GHz) or MRF24J40MA compatible with Microchip's ZigBee® and MiWi™ development environment software stacks may be used. It may be appreciated by those skilled in the art that the data acquisition, processing, display, and control components described are only representing sample means for achieving the processing and use of capacitance information from the sensor pixel array embodiments of the disclosed invention and there can be several other approaches and means available in the art that can be deployed and all such alternate means are covered by the scope and spirit of the disclosed invention.

We claim:

1. A tactile array sensor comprising:
   an array of sensor pixels formed by capacitance between overlapped layers of conductor electrodes;
   one layer of conductor electrodes provided by a common ground electrode laid in substantially spiral configuration with an end coming out radially after the spiral;
   another layer of conductor electrode pads arranged over the spiral ground electrode and connected to conductors laid in substantially spiral configuration with the ends of the conductors coming out radially in a common direction after the spiral;
   a means to achieve the said capacitance by pre-insulation of the said conductor electrodes in the second layer by dielectric material coated around the said conductor electrodes individually;
   a means to hold the said sensor pixels in the said configuration;
   functioning of sensor pixels by change in capacitance effected by sensing;
   a means to enable data acquisition from the sensor pixel array, its processing, and display or control of external devices based on the sensed information.

2. A tactile array sensor of claim 1 wherein reduction of the burden of number of connections at one layer of conductors in the sensor is achieved by common spiral ground conductor electrode electrically connected to a common terminal at one end at the periphery of the sensor array.

3. A tactile array sensor of claim 1 wherein reduction of the overall computation burden of the sensor is achieved by providing for a broader resolution of sensor array at one region while maintaining a closer resolution of sensing array at another region of the sensor.

4. A method of use of a tactile array sensor of claim 1 comprising the steps:
   (a) the tactile array sensor is attached to a robot body part such that the array of sensor pixels are exposed on the exterior surface of the robot body part
   (b) the resolution of sensor pixels at different robot body parts is configured according to the needs of the respective body parts
   (c) feedback from interaction of sensor pixels with environment around the robot conveys information to the robot or other control system.

5. A tactile array sensor comprising:
   an array of sensor pixels formed by capacitance between overlapped layers of conductor electrodes;
   one layer of conductor electrodes provided by a common ground electrode laid as a conductive surface with perforations;
   another layer of conductor electrode pads arranged over the common ground electrode and connected to insulated conductors passing through the said perforations in a direction perpendicular to the surface of the tactile array sensor pixels;
   a means to achieve the said capacitance by use of a dielectric material layer between the said layers of conductor electrodes;
   a means to hold the said sensor pixels in the said configuration;
   functioning of sensor pixels by change in capacitance effected by sensing;
   a means to enable data acquisition from the sensor pixel array, its processing, and display or control of external devices based on the sensed information.

6. A tactile array sensor of claim 5 wherein sensing pads are assembled modularly by use of separate dielectric material washers providing for repair or replacement of individual sensor pixels.

7. A tactile array sensor of claim 5 wherein reduction of the burden of number of connections at one layer of conductors in the sensor is achieved by common ground conductor electrode electrically connected to a common terminal.

8. A tactile array sensor of claim 5 wherein reduction of the overall computation burden of the sensor is achieved by providing for a broader resolution of sensor array at one region while maintaining a closer resolution of sensing array at another region of the sensor.

9. A method of use of a tactile array sensor of claim 5 comprising the steps:
   (a) the tactile array sensor is attached to a robot body part such that the array of sensor pixels are exposed on the exterior surface of the robot body part
   (b) the resolution of sensor pixels at different robot body parts is configured according to the needs of the respective body parts
   (c) feedback from interaction of sensor pixels with environment around the robot conveys information to the robot or other control system.

* * * * *